(12) United States Patent
Sizemore et al.

(10) Patent No.: US 11,449,675 B2
(45) Date of Patent: *Sep. 20, 2022

(54) SELECTIVE DEEP PARSING OF NATURAL LANGUAGE CONTENT

(71) Applicant: International Business Machines Corporation, Armonk, NY (US)

(72) Inventors: Robert C. Sizemore, Fuquay-Varina, NC (US); David B. Werts, Charlotte, NC (US); Sterling R. Smith, Raleigh, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/375,106

(22) Filed: Jul. 14, 2021

(65) Prior Publication Data

US 2021/0342533 A1    Nov. 4, 2021

Related U.S. Application Data

(63) Continuation of application No. 16/576,906, filed on Sep. 20, 2019, now Pat. No. 11,120,216.

(51) Int. Cl.
*G06F 40/205*    (2020.01)
*G06F 40/14*    (2020.01)
*G06F 40/279*    (2020.01)

(52) U.S. Cl.
CPC ............ *G06F 40/205* (2020.01); *G06F 40/14* (2020.01); *G06F 40/279* (2020.01)

(58) Field of Classification Search
CPC .................................................. G06F 40/205
See application file for complete search history.

(56) References Cited

U.S. PATENT DOCUMENTS

| 9,292,490 B2 | 3/2016 | Kimelfeld et al. |
| 9,323,747 B2 | 4/2016 | Anisimovich et al. |
| 10,133,724 B2 | 11/2018 | Bethard et al. |

(Continued)

FOREIGN PATENT DOCUMENTS

| CN | 105868758 A | 8/2016 |
| CN | 107291701 A | 10/2017 |

OTHER PUBLICATIONS

List of IBM Patents or Patent Applications Treated as Related, Jul. 14, 2021, 2 pages.

(Continued)

*Primary Examiner* — Asher D Kells
(74) *Attorney, Agent, or Firm* — Stephen J. Walder, Jr.

(57) ABSTRACT

Mechanisms are provided to perform selective deep parsing of natural language content. A targeted deep parse natural language processing system is configured to recognize one or more triggers that specify elements within natural language content that indicate a portion of natural language content that is to be targeted with a deep parse operation. A portion of natural language content is received and a pre-deep parse scan operation is performed on the natural language content based on the one or more triggers to identify one or more sub-portions of the natural language content that contain at least one of the one or more triggers. A deep parse is performed on only the one or more sub-portions of the portion of natural language content that contain at least one of the one or more triggers, while other sub-portions of the portion of natural language content are not deep parsed.

16 Claims, 4 Drawing Sheets

(56) References Cited

U.S. PATENT DOCUMENTS

| | | | |
|---|---|---|---|
| 2009/0171625 A1* | 7/2009 | Razdow | G06F 16/36 702/187 |
| 2011/0125734 A1 | 5/2011 | Duboue et al. | |
| 2015/0095017 A1 | 4/2015 | Mnih et al. | |
| 2015/0319267 A1 | 11/2015 | Steven | |
| 2016/0062965 A1 | 3/2016 | Bostick et al. | |
| 2017/0092332 A1 | 3/2017 | Bostick et al. | |
| 2018/0031385 A1 | 2/2018 | Bostick et al. | |
| 2019/0163739 A1 | 5/2019 | Marascu et al. | |
| 2021/0089616 A1 | 3/2021 | Sizemore et al. | |

OTHER PUBLICATIONS

International Search Report and Written Opinion dated Dec. 16, 2020 for International Application No. PCT/IB2020/058422, 9 pages.

Anonymous, "Method and System for Automatically Refining a Set of Search Results using Natural Language Processing", IP.com, IP.com No. IPCOM000239536D, Nov. 13, 2014, 4 pages.

Anonymous, "System and Method for Computationally Effective Deep Parsing of Natural Language", IP.com, IP.com No. IPCOM000225172D, Jan. 28, 2013, 4 pages.

High, Rob, "The Era of Cognitive Systems: An Inside Look at IBM Watson and How it Works", IBM Corporation, Redbooks, Dec. 12, 2012, 16 pages.

Schafer, Ulrich, "Integrating Deep and Shallow Natural Language Processing Components—Representations and Hybrid Architectures", Dissertation, Universitat des Saarlandes, Dec. 10, 2006, 324 pages.

Thomason, Jesse et al., "Jointly Improving Parsing and Perception for Natural Language Commands through Human-Robot Dialog", Late-breaking Track at the SIGDIAL Special Session on Physically Situated Dialogue (RoboDIAL-18), Melbourne, Australia, Jul. 2018, 10 pages.

Young, Tom et al., "Recent Trends in Deep Learning Based Natural Language Processing", arXiv: 1708.02709v8 [cs.CL], Nov. 25, 2018, pp. 1-32.

Yuan, Michael J., "Watson and Healthcare, How natural language processing and semantic search could revolutionize clinical decision support", IBM Corporation, developerWorks, http://www.ibm.com/developerworks/industry/library/ind-watson/, Apr. 12, 2011, 14 pages.

Examination Report under Section 18(3) dated May 26, 2022 for Application No. GB2204877.1, 7 pages.

* cited by examiner

SELECTIVE DEEP PARSING OF NATURAL LANGUAGE CONTENT

BACKGROUND

The present application relates generally to an improved data processing apparatus and method and more specifically to an improved computer tool and computer mechanisms for performing selective deep parsing of natural language content for use with natural language parsing mechanisms of a computer system.

Natural language processing (NLP) is a subfield of linguistics, computer science, information engineering, and artificial intelligence concerned with the interactions between computers and human (natural) languages, and is particularly directed to how to make computers process and analyze large amounts of natural language data. Challenges in natural language processing frequently involve speech recognition, natural language understanding, and natural language generation. Natural language processing mechanisms involve complex tasks regarding syntax, semantics, discourse and speech.

Many modern artificial intelligence systems utilize NLP as a foundational operation for performing other more complex inference, machine learning, or other cognitive computing operations. For example, the IBM Watson™ cognitive computing system, available from International Business Machines (IBM) Corporation of Armonk, N.Y., utilizes NLP as an operation for ingesting one or more large corpora of electronic content provided in structured and/or unstructured formats, such as natural language (unstructured) documents, and generating in-memory representations of the electronic content for use in performing other cognitive computing operations, e.g., decision support operations, question answering, etc. Such artificial intelligence systems require large amounts of electronic content in the one or more corpora in order to perform accurate cognitive operations.

A primary operation performed by NLP computing systems is parsing of natural language content so as to identify syntactic and semantic features of the natural language content. The parsing operation analyzes the natural language terms/phrases and generates a more useful in-memory format, e.g., a parse tree, based on rules of a formal grammar.

Parsing is often referred to as either being shallow or deep. Shallow syntactic parsing, also referred to as "chunking," is used to identify parts of speech, e.g., nouns, verbs, preposition phrases, and so forth, in the portion of natural language content and then link them to higher order units that have discrete grammatical meanings, e.g., noun groups or phrases, verb groups, etc. Deep syntactic parsing produces full parse trees in which the syntactic function of each word or phrase is tagged with a short label. Thus, shallow parses may be considered to generate different sets of partial parse trees, while a deep parse generates complete parse trees for the portion of natural language content. One example of a deep parser is the English Slot Grammar (ESG) parser of the IBM Watson™ cognitive computing system.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, wherein the at least one memory comprises instructions that are executed by the at least one processor to configure the at least one processor to implement a targeted deep parse natural language processing system. The method comprises configuring the targeted deep parse natural language processing system to recognize one or more triggers, wherein the triggers are elements within natural language content that indicate a portion of natural language content that is to be targeted with a deep parse operation. The method further comprises receiving, by the targeted deep parse natural language processing system, a portion of natural language content from a corpus of natural language content. Moreover, the method comprises performing, by the targeted deep parse natural language processing system, a pre-deep parse scan operation of the portion of natural language content based on the one or more triggers to identify one or more sub-portions of the portion of natural language content that contain at least one of the one or more triggers. In addition, the method comprises performing, by the targeted deep parse natural language processing system, a natural language processing operation comprising a deep parse of only the one or more sub-portions of the portion of natural language content that contain at least one of the one or more triggers, while other sub-portions of the portion of natural language content are not deep parsed. In this way, a targeted deep parsing of natural language content is made possible such that the computational resources for performing deep parsing is minimized.

In another illustrative embodiment, configuring the targeted deep parse natural language processing system comprises determining one or more annotators of a cognitive computing system that are enabled to process the portion of natural language content, and configuring the targeted deep parse natural language processing system with configuration information associated with the one or more annotators, wherein the configuration information specifies triggers for each of the one or more annotators. In this way, the mechanisms of the illustrative embodiment may tailor the triggers for identifying portions of natural language content to perform deep parsing on, to the specific downstream annotators or logic that is enabled for the natural language processing operation to be performed.

In another illustrative embodiment, performing the pre-deep parse scan operation of the portion of natural language content comprises associating with each of the one or more sub-portions of the portion of natural language content, a deep parse indicator specifying that the one or more sub-portions of the portion of natural language content are to be deep parsed by a deep parser of the targeted deep parse natural language processing system. In this way, sub-portions may be flagged for deep parsing such that the deep parser is informed which sub-portions to perform the deep parse on and which ones not to perform a deep parse on.

In still another illustrative embodiment, performing the natural language processing operation comprising the deep parse of only the one or more sub-portions of the portion of natural language content that contain at least one of the one or more triggers comprises executing a deep parser on the portion of natural language content, wherein the deep parser skips sub-portions of the portion of natural language content that do not have associated deep parse indicators. Thus, with these mechanisms of the illustrative embodiment, the deep parser is able to skip entire sub-portions of the natural language content rather than expending resources on deep parsing these sub-portions that will be of little use to downstream logic or annotators.

In another illustrative embodiment, performing the natural language processing operation comprises generating a parse tree for each of the one or more sub-portions and performing a natural language processing operation on the parse trees for the one or more sub-portions. The parse tree allows the downstream logic or annotators to perform complex analysis of natural language content that supports performing other cognitive computing operations.

In some illustrative embodiments, the one or more triggers comprise one or more of terms, phrases, character strings, or metadata. Thus, by searching for these triggers in the natural language content and/or metadata, targeted deep parsing may be specifically targeted on those sub-portions that have the corresponding terms, phrases, character strings, or metadata.

In still other illustrative embodiments, the one or more sub-portions of the portion of natural language content comprises at least one portion of metadata associated with the natural language content. Thus, the mechanisms of these illustrative embodiments may also look to the metadata to identify instances of triggers that may be associated with sections of the natural language content which can then be flagged or marked for deep parsing.

In some illustrative embodiments, a granularity of each sub-portion is specified in configuration information used to configure the targeted deep parse natural language processing system, and wherein each trigger has an associated granularity specified in the configuration information, and wherein at least two different triggers have different granularities. In this way, different size sub-portions of the natural language content may be flagged or marked for deep parsing based on the particular triggers being present in the natural language content, e.g., for one trigger the sub-portion may be a sentence, whereas for another trigger, the sub-portion may be a paragraph.

In still other illustrative embodiments, the granularity specified in the configuration information comprises, for at least one of the triggers in the one or more triggers, an exclusion granularity specifying a sub-portion of the portion of natural language content that is to be excluded from a deep parse by a deep parser as part of the performance of the natural language processing operation. In this way, the configuration information may specify entire sub-portions of the natural language content that are not of importance to downstream logic or annotators and may be skipped by the deep parsing by specifying that they be excluded.

In some illustrative embodiments, the natural language processing operation is performed in response to a request from a client computing device, and wherein the natural language processing operation comprises at least one of a decision support natural language processing operation, a question answering operation, or a recommendation generation operation, for responding to the request. Thus, the mechanisms of the illustrative embodiments may improve the performance of these types of natural language processing operations by minimizing the expenditure of computing resources to perform deep parses to generate parse trees upon which these natural language processing operations operate.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
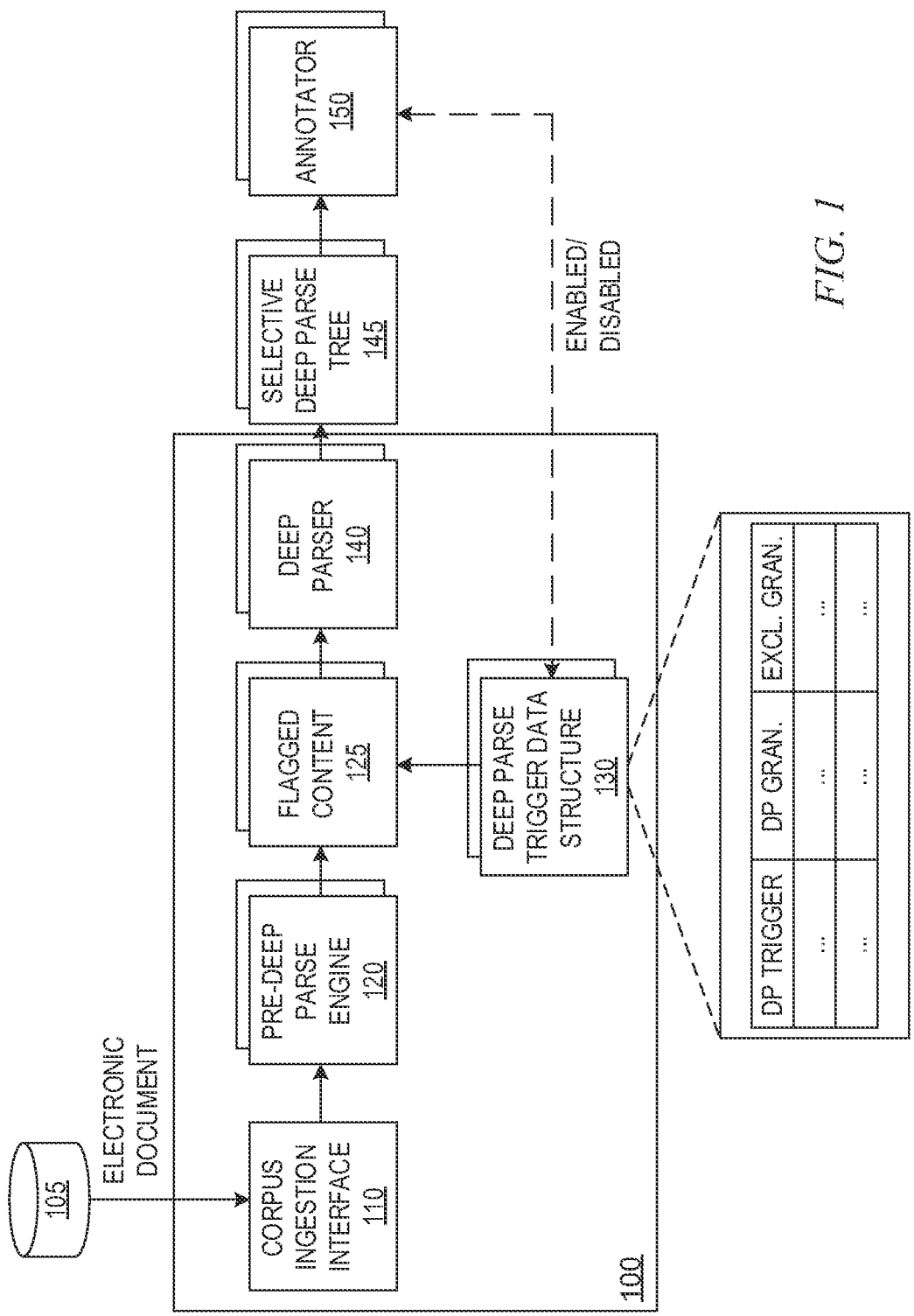
FIG. 1 is an example block diagram illustrating the primary operational elements of a selective targeted deep parse natural language processing system in accordance with one illustrative embodiment.

As noted above, many artificial intelligence computing systems, such as the IBM Watson™ cognitive computing system, operate based on natural language processing of unstructured natural language in electronic content. In particular, the natural language in the electronic content is parsed and processed to generate an in-memory representation of the natural language that is in a format that can more easily be understood and processed by the artificial intelligence computing system so as to perform its more complex reasoning, inference, decision support, or other more cognitive operations. As part of performing this natural language processing of the natural language in the electronic content, the natural language is parsed using a natural language parser. With artificial intelligence computing systems, this parsing generally requires a deep parse of the natural language in order to provide all the information that the more complex operations require to perform their functions accurately.

A deep parse of natural language in electronic content, e.g., an electronic document in a corpus of electronic documents, requires a relatively larger amount of time and computing resources to accomplish than a shallow parse. As the corpora that the artificial intelligence or cognitive computing systems operate on comprise large volumes of electronic content, e.g., electronic documents, performing a deep parse on all portions of the electronic documents in a corpus becomes a very time consuming and computation intensive process. Thus, the deep parse operations tend to be a limitation on performance of the artificial intelligence or cognitive computing system. It would be beneficial to provide a mechanism for limiting the amount of deep parsing required while maintaining the accuracy of the artificial intelligence or cognitive computing system operations that rely on the results of the deep parsing of natural language in electronic content, i.e. natural language content.

The illustrative embodiments provide mechanisms for performing a selective deep parse of natural language content. The selective deep parse performs deep parsing only on portions of documents that are determined to be pertinent to the particular purpose of the parsing, i.e. the particular intent of the annotators involved and used by the artificial intelligence or cognitive computing system. In other words, the downstream functionality of artificial intelligence or cognitive computing system is used as a basis for determining what portions of natural language content are of specific importance to these downstream functions and only those portions of the natural language content determined to be of specific importance are targeted for deep parsing rather than performing a deep parsing of the entirety of each portion of electronic content. Thus, rather than having to perform a deep parse of each portion of electronic content in the corpus, selective deep parsing is performed only on those portions of electronic content determined to be of specific importance to the downstream functions, e.g., the annotators used to annotate natural language content for processing by artificial intelligence or cognitive computing system operations. e.g., inference logic, reasoners, and the like.

With the mechanisms of the illustrative embodiments, a pre-deep parse engine operates to perform an initial coarse grain analysis of a portion of electronic content, hereafter assumed to be one or more portions of an electronic document stored as a data structure in a storage system or computing system comprising one or more electronic documents which are part of one or more corpora of electronic content. As can be appreciated, the one or more corpora may comprise electronic documents from various storage systems and/or computing systems. Moreover, rather than an entire electronic document, the electronic content may comprise a portion of an electronic document or any other electronic data in which natural language content or text is present, e.g., one or more passages, sentences, paragraphs, or any other sub-section of an electronic document, files, web page content, etc. Of particular concern to the present invention is that the electronic content comprises natural language content that is the subject of natural language processing, such as for performing artificial intelligence or cognitive computing operations.

The coarse grain analysis performed by the pre-deep parse engine operates to identify deep parse triggers present either in the natural language content of the portions of the electronic document or in the metadata associated with the portions of the electronic document. The pre-deep parse engine may be configured with configuration information specifying the deep parse triggers for the particular downstream logic that will operate on a deep parse tree of the natural language content of the portions of the electronic document. This downstream logic, in one illustrative embodiment, may be one or more annotators of an artificial intelligence or cognitive computing system, such as the IBM Watson™ cognitive computing system, which operate on a deep parse tree data structure generated by the parsing to identify particular concepts, entities, or the like, referenced in natural language content and/or relationships between such concepts, entities, etc.

For example, in the IBM Watson™ cognitive computing system, annotators extract concepts, words, phrases, classifications, named entities, and the like, from unstructured content and mark these extractions as annotations. These annotators may be configured to identify and extract specific types of concepts, words, phrases, classifications, named entities, and the like depending on the particular purpose to which the IBM Watson™ cognitive computing system is being implemented, e.g., if the instance of IBM Watson™ is for medical treatment recommendation, then the annotators will be directed to identifying/extracting particular medical concepts, words, phrases, classifications, etc. but if the instance is for financial transaction recommendations, then the annotators may identify/extract particular financial concepts, words, phrases, classifications, etc. The annotations generated by the annotators are added to an index of tokens or facets and used as a source for content analysis. In IBM Watson™, a large library of annotators may be provided and selected annotators may be enabled for the particular use to which the instance of IBM Watson™ is being used. Moreover, in some implementations, end users may define their own annotators and enable/disable those annotators when desired. Examples of annotators include language identification annotators, linguistic analysis annotators, content classification annotators, named entity recognition annotators, dictionary lookup annotators, pattern matcher annotators, custom annotators, and the like. More information about IBM Watson™ and annotators used by IBM Watson™ may be found at the IBM Knowledge Center website.

The pre-deep parse engine may be configured with configuration information specifying deep parse triggers for a plurality of enabled downstream logic, e.g., annotators, or a separate pre-deep parse engine may be provided for each enabled downstream logic, assumed hereafter to be an annotator for purposes of illustration. In an example embodiment in which there is a separate pre-deep parse engine for each enabled annotator, the pre-deep parse engine may identify instances of deep parse triggers in the natural language content and/or metadata of the electronic document, where those deep parse triggers are specific to the particular associated annotator. The portions of the electronic document that have such deep parse triggers may be flagged, annotated, or otherwise marked using metadata or indicators, for deep parsing by a deep parser of the artificial intelligence or cognitive computing system.

Thus, by identifying instances of the deep parse triggers in the natural language content or metadata of the electronic document, the pre-deep parse engine may determine which portions of the electronic document, if any, are likely to contain natural language content that may be pertinent to the downstream logic operations of the annotators. These portions of the electronic document may then be flagged for deep parsing by a deep parser which may perform the deep parse and generate a complete parse tree for those flagged portions of the electronic document such that the annotators may utilize the complete parse tree to perform their operations. This process may be repeated for each electronic document that is being ingested so as to determine, for each electronic document, whether a deep parse of portions of the electronic document would be appropriate for the particular enabled annotators, or downstream logic, being utilized by the particular instance of the artificial intelligence or cognitive computing system.

The deep parse triggers for particular downstream logic, e.g., annotators, may comprise any terms, phrases, character strings, metadata, or other portion of content that has been identified as being of interest to the operation of the corresponding downstream logic/annotator. For example, for one annotator, negation terms may be used as deep parse triggers to identify portions of an electronic document needing a deep parse, e.g., "not", "denies", etc. The particular deep parse triggers will be specific to the particular downstream logic or annotator such that there may be a different set of deep parse triggers for different downstream logic or annotators.

To further understand the concept of deep parse triggers and downstream logic or annotators, consider the following examples. As a first example, consider a given portion of natural language content comprising the sentence "John grant the request." A Named Entities annotator would most likely create an annotation over John Grant as that could be a person's name. However, in looking at the text one would not say that John Grant is a name, as the word "grant" in the context of the sentence is a verb implying that John is to, or has granted someone a request. In this example, the Person Entity annotation over the text "John grant" would be the trigger. A deep parse on the sentence covered by this trigger would show that "grant" is part of a verb phrase and thus, should not allow a Person Entity annotation to be placed over the text "John grant." Now consider a second sentence, "John Grant honored the request." In this case, John Grant is clearly a person and within this sentence a Person Entity annotation would be created over that name. Again, that annotation would be the trigger to do a deep parse on the sentence, where this time parsing would show that "Grant" is a proper noun and "honored" would be the verb. Thus, this Person Entity annotation would not be filtered out.

As another example, consider the sentence "It was determined that he did not have lung cancer." The trigger "not" would be applicable to the Negation Annotator. Therefore, the deep parse would be done on this sentence due to the sentence containing a negation trigger, and the Negation Annotator would use that information to determine the span of text that should be negated is "lung cancer". Sentences that did not contain potential negation triggers would not be deep parsed.

The particular portions of the electronic document that are flagged for deep parsing by a deep parser may be based on the structure of the electronic document itself. Thus, for example, if the electronic document has a structure of title, headers, sections, and paragraphs, then if the deep parse trigger is found in the natural language content or metadata of the electronic document, the corresponding paragraph or other portion of the electronic document may be flagged for deep parse by the deep parser. The granularity of the portion of the electronic document that is flagged, referred to as the deep parse granularity, may be specified in association with the particular deep parse trigger such that one annotator may have the paragraph flagged for deep parse, whereas another annotator may have an entire section or even the entire electronic document flagged for deep parse. Moreover, the deep parse granularity may also specify portions of the electronic document that are not needed by the downstream logic/annotator and can be skipped by a deep parser, i.e. a deep parse exclusion granularity. For example, an electronic document may be a patient's electronic medical record, in a medical recommendation system, and the deep parse granularity information may specify that a lab results information section of the EMR should be flagged for deep parse when a deep parse trigger is found in the EMR, however the family history information section is not needed for the downstream logic/annotator and can be skipped by the deep parser. Thus, by associating with each set of deep parse triggers, or even individual deep parse triggers within each set, a corresponding deep parse granularity and/or deep parse exclusion granularity, the deep parser is informed of which portions of the electronic document to target with its operations and which portions to skip.

The deep parser may be a general deep parser used by all of the downstream logic/annotators that are enabled for the instance of the artificial intelligence or cognitive computing system, or may be a separate deep parser specific to the particular downstream logic/annotator. Assuming that the electronic document has been processed by the pre-deep parse engine and portions of the electronic document are flagged for deep parse and/or exclusion from deep parse, the deep parser(s) parse the natural language content of the portions of the electronic document(s) flagged for deep parse and skips those portions that are not flagged for deep parse or are specifically flagged for exclusion from deep parse. The deep parser(s) generate corresponding complete or deep parse trees for those flagged portions of the electronic document(s) which are flagged for deep parse. The resulting deep parse trees are then operated on by the downstream logic/annotators so as to perform their operations in a manner as is generally known in the art.

Thus, by performing the pre-deep parse analysis, the mechanisms of the present invention allow for selective targeted deep parsing of natural language content present in electronic content such that only those portions of the electronic content determined to be most relevant to the particular operations performed by the artificial intelligence or cognitive computing system. That is, the deep parsing is not performed on all of the content of a corpus, but instead is executed in a targeted manner by targeting those portions of the content that are of higher relevance to the operations of the downstream logic/annotators. This greatly reduces the amount of time and computation resources needed to generate parsed information for use by the artificial intelligence or cognitive computing system. It has been estimated that, for some implementations of an artificial intelligence or cognitive computing system, by performing such pre-deep parse analysis and selective targeted deep parsing, approximately a 70% improvement in performance may be achieved over systems that utilize deep parsing of the entire contents of the electronic documents of a corpus. Of course, this improvement may vary depending on the particular implementation of the artificial intelligence or cognitive computing system as well as the content of the corpus.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on computing hardware, software instructions stored on a medium such that the instructions are readily executable by specialized hardware or other computing hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, executed software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

It should be appreciated that the configuring of a computing device, computing system, or data processing system, by loading into memory the instructions of a computer readable program and then executing those instructions by one or more processors of the computing device, computing system, or data processing system, renders the computing device/system to be a specific purpose device/system as opposed to a general purpose computing device/system that is specifically configured to perform the particular ordered combination of operations set forth in the instructions.

Moreover, references herein to elements upon which these instructions are executed, even if not specified as such, are performed on data structures representing such elements. For example, if the present specification recites that an operation X is performed on an element Y, then the operation X references one or more instructions specifically configured to perform the specified operation and element Y references a data structure representing the element Y. This understanding is based on the fact that computers and data processing systems only operate on data structures, whether those data structures represent instructions or data.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the present invention provides mechanisms for selective targeted deep parsing of natural language content based on deep parse triggers associated with downstream logic/annotators and a pre-deep parse engine evaluation of electronic content. The mechanisms of the illustrative embodiments are specifically directed to providing an improved computer tool for improving the parsing of electronic content so as to reduce the amount of time and computing resources needed to generate deep parse information usable by the downstream logic/annotators. The mechanisms of the illustrative embodiments may be used with any computing system or data processing system implementing natural language processing in which deep parsing may be utilized to achieve the natural language processing operations. In the example embodiments described herein, the natural language processing operations are used as a basis for performing additional artificial intelligence or cognitive computing system operations, such as decision support operations, question answering operations, recommendation generation, or any other complex artificial intelligence or cognitive computing operation.

In one illustrative embodiment, a selective targeted deep parse natural language processing system is configured to recognize one or more deep parse triggers, wherein the deep parse triggers are elements within natural language content that indicate a portion of natural language content that is to be targeted with a deep parse operation. The targeted deep parse natural language processing system then receives a portion of natural language content from a corpus of natural language content and performs a pre-deep parse scan operation of the portion of natural language content based on the one or more triggers to identify one or more sub-portions of the portion of natural language content that contain at least one of the one or more triggers. The targeted deep parse natural language processing system then performs a deep parse of only the one or more sub-portions of the portion of natural language content that contain at least one of the one or more triggers, while other sub-portions of the portion of natural language content are not deep parsed. Furthermore, the targeted deep parse natural language processing system performs a natural language processing operation on the portion of natural language content based on results of performing the targeted deep parse on the one or more sub-portions of the portion of natural language content.

FIG. 1 is an example block diagram illustrating the primary operational elements of a selective targeted deep parse natural language processing system in accordance with one illustrative embodiment. As shown in FIG. 1, the selective targeted deep parse natural language processing system 100 comprises a corpus ingestion interface 110, a pre-deep parse engine 120, one or more deep parse trigger data structures 130, and one or more deep parsers 140. As shown in FIG. 1, the pre-deep parse engine 120 is initially configured with the one or more deep parse trigger data structures 130 for particular downstream logic/annotators 150 for which deep parsing is to be performed. The one or more deep parse trigger data structures 130 comprise deep parse triggers and indicators of portions of natural language content in an electronic document that are to be flagged for either deep parse or exclusion from deep parse by a deep parser. The pre-deep parse engine 120 performs a coarse grain analysis of electronic documents received from a corpus 105 via the corpus ingestion interface 110 based on the deep parse trigger data structure(s) 130 for enabled downstream logic, e.g., annotators 150. The pre-deep parse engine 120 generates a version of the received electronic document 125 with portions of the natural language content flagged (annotated) for deep parsing and/or exclusion from deep parsing. The deep parsers 140 perform deep parsing only on the portions of the electronic document that are flagged for deep parsing in the flagged content 125. The deep parsers 140 generate selective deep parse trees 145 to the downstream logic, e.g., annotators 150, for use in performing their operations.

It should be appreciated that different deep parse trees 145 may be provided to different ones of the annotators 150 based on particular deep parse trigger data structures 130 applied and associations with the deep parsers 140. For example, there may be different deep parses 140 for different ones of the downstream logic, e.g., annotators 150. Thus, a deep parser 140 may generate a selected deep parse tree 145 for the particular annotator 150 such that different annotators 150 may receive different deep parse trees 145. Alternatively, the same deep parse tree, comprising a deep parse of all of the portions of the electronic document flagged for deep parse may be provided in a single selective deep parse tree 145, may be provided to each of the annotators 150.

Thus, in operation, when an electronic document is being ingested for processing by a natural language processing based computer system, such as an artificial intelligence or cognitive computing system, although the present invention does not require any further operations beyond the natural language processing, the electronic document from the corpus 105 is provided to the pre-deep parse engine 120. The pre-deep parse engine 120 operates to perform an initial coarse grain analysis of the electronic document. The coarse grain analysis performed by the pre-deep parse engine 120 operates to identify deep parse triggers present either in the natural language content of portions of the electronic document or in the metadata associated with the portions of the electronic document. The pre-deep parse engine 120 is configured based on the deep parse trigger data structures 130 that correspond to the downstream logic/annotators 150 that are enabled. The deep parse trigger data structures 130 specify the deep parse triggers for the particular corresponding downstream logic/annotators 150 that will operate on a deep parse tree of the natural language content of the portions of the electronic document.

Thus, for example, which downstream logic modules/annotators 150 are enabled may be communicated to the selective targeted deep parse natural language processing system 100 by the computing system implementing the downstream logic modules/annotators 150 so that corresponding ones of the deep parse trigger data structures 130 may be used to configure the pre-deep parse engine 120. The deep parse trigger data structures, in one illustrative embodiment, specify deep parse triggers along with corresponding deep parse granularity and/or exclusion granularity indicators. The deep parse granularity indicators specify the portions of the electronic document to flag, i.e. annotate for performance of deep parsing, for deep parsing. For example, in response to the corresponding deep parse trigger being found in natural language content of the electronic document, a portion of the electronic document comprising the deep parse trigger or associated with the deep parse trigger, specified by the deep parse granularity indicator, is flagged for deep parsing. This portion of the electronic document may be any compartmentalized portion of the electronic document, e.g., a sentence, paragraph, passage, section, the entire electronic document, etc.

As examples of deep parse triggers for marking or flagging portions of natural language content for deep parsing, consider an enabled downstream annotator that is a negation annotator. For the negation annotator, the following may represent some of the deep parse triggers that would indicate that a corresponding sub-portion of the natural language content should be flagged or marked for deep parsing:
lack
abatement
dismissal
elimination
denial
inhibition
none
nothing
refusal
cessation
absence
exclusion All of these triggers would cause a deep parse of the surrounding sentence and the Negation Annotator would then process those sentences for potential negation spans.

As another example, consider a Hypothetical Annotator which identifies the spans of text that are the object of a hypothetical statement, e.g., "The lawyer discussed the possibility of filing a lawsuit with his client." In this example, a lawsuit has not been filed, only a a discussion of a lawsuit has taken place. Here are some triggers associated with the Hypothetical Annotator that would indicate to do a deep parse of the sentence:
chance
likelihood
may
shall
chance
when
will
arrange
discuss
consider
pending
schedule
submit
consideration
fear
implication
likelihood
probability
anticipate
if
less
most
not Again, for the Hypothetical Annotator, all of these triggers would cause a deep parse of the surrounding sentence and the Hypothetical Annotator would then process those sentences for potential hypothetical spans.

The exclusion granularity indicators specify portions of the electronic document that do not need to be deep parsed for the corresponding downstream logic/annotator 150. It should be appreciated that exclusion granularity indicators are optional and do not need to be used in each implementation of the illustrative embodiments. However, it has been determined that in some implementations for different domains, e.g., the medical domain, financial domain, or the like, it is beneficial to include such exclusion granularity indicators to identify portions of electronic documents that should not be deep parsed.

For example, in the medical domain, an example of an exclusion indicator may be around a section on family history. In this case, where the concern is directly about the patient, any name, location, or institution annotation discovered within this section of the document would be unimportant to the current task and thus, should not be deep parsed. Likewise, in a financial domain, if the current application is only interested in the stock market, any entity annotation found in sections specific to bonds or short-term options would be unimportant and thus not require further deep parsing. One such implementation of this is to pre-search these documents for unwanted sections and to annotate ignore annotations over these sections. In that manner both trigger annotation and deep parsing of sentences based on triggers can be excluded.

The pre-deep parse engine 120 may be configured with deep parse trigger data structures 130 specifying deep parse triggers for a plurality of enabled downstream logic/annotators 150 or a separate pre-deep parse engine 120 may be provided for each enabled downstream logic/annotator 150. In an example embodiment in which there is a separate pre-deep parse engine 120 for each enabled annotator, the pre-deep parse engine 120 may identify instances of deep parse triggers in the natural language content and/or metadata of the electronic document, where those deep parse triggers are specific to the particular associated annotator 150. The portions of the electronic document that have such deep parse triggers may be flagged for deep parsing by a corresponding deep parser 140.

The deep parse triggers for particular downstream logic modules/annotators 150 may comprise any terms, phrases, character strings, metadata, or other portion of content that has been identified as being of interest to the operation of the corresponding downstream logic/annotator. The particular deep parse triggers will be specific to the particular corresponding downstream logic module/annotator 150 such that there may be a different set of deep parse triggers for different downstream logic modules/annotators 150.

The pre-deep parse engine 120 analyzes the received electronic document to find matches of deep parse triggers in the deep parse trigger data structure(s) 130 in the content and/or metadata of the electronic document. In response to a deep parse trigger being found in the electronic document, the deep parse granularity and/or exclusion granularity for that deep parse trigger is used to specify which portion(s) of the electronic document to flag (annotate) by the pre-deep parse engine 120 for deep parsing and/or exclusion from deep parsing. The pre-deep parse engine 120 inserts into the electronic document data structure, deep parse flags or annotations in association with or otherwise point to the portions of the electronic document that are to be deep parsed and/or excluded from deep parsing. A resulting flagged version of the electronic document 125 is generated where the deep parse flags, or deep parse annotations, are included to inform the deep parser(s) 140 which portions of the electronic document to parse and which to skip. The deep parser(s) 140 receive the flagged version of the electronic document 125 and performs a deep parse of the portions of the electronic document that are flagged for deep parsing. The deep parser(s) 140 generate selective deep parse tree data structure(s) 145 which are output to the downstream logic modules/annotators 150. The deep parser(s) 140 may comprise a general deep parser used by all of the downstream logic/annotators 150 that are enabled for the instance of the natural language processing based computer system, or may comprise separate deep parsers, each one being specific to a corresponding one of the downstream logic modules/annotators 150.

The downstream logic modules/annotators 150 perform their operations based on the selective deep parse tree data structure(s) 145 to annotate and/or other perform other analysis of the natural language content of the electronic document. The particular operations performed by the downstream logic modules/annotators 150 will depend on the particular use to which the natural language processing based system, e.g., artificial intelligence or cognitive computing system, is put. For example, different operations may be performed for a cognitive computing system performing question answering as opposed to a cognitive computing system performing medical treatment recommendation operations.

Thus, by performing the pre-deep parse analysis, the mechanisms of the illustrative embodiments provide selective targeted deep parsing of natural language content present in electronic content such that only those portions of the electronic content determined to be most relevant to the particular operations performed by the downstream logic modules/annotators of the natural language processing based computing system, e.g., artificial intelligence or cognitive computing system, are deep parsed. Thus, the deep parsing is not performed on all of the content of a corpus, but instead is executed in a targeted manner by targeting those portions of the content that are of higher relevance to the operations of the downstream logic modules/annotators. This greatly reduces the amount of time and computation resources needed to generate parsed information for use by the artificial intelligence or cognitive computing system.

Figure 2:
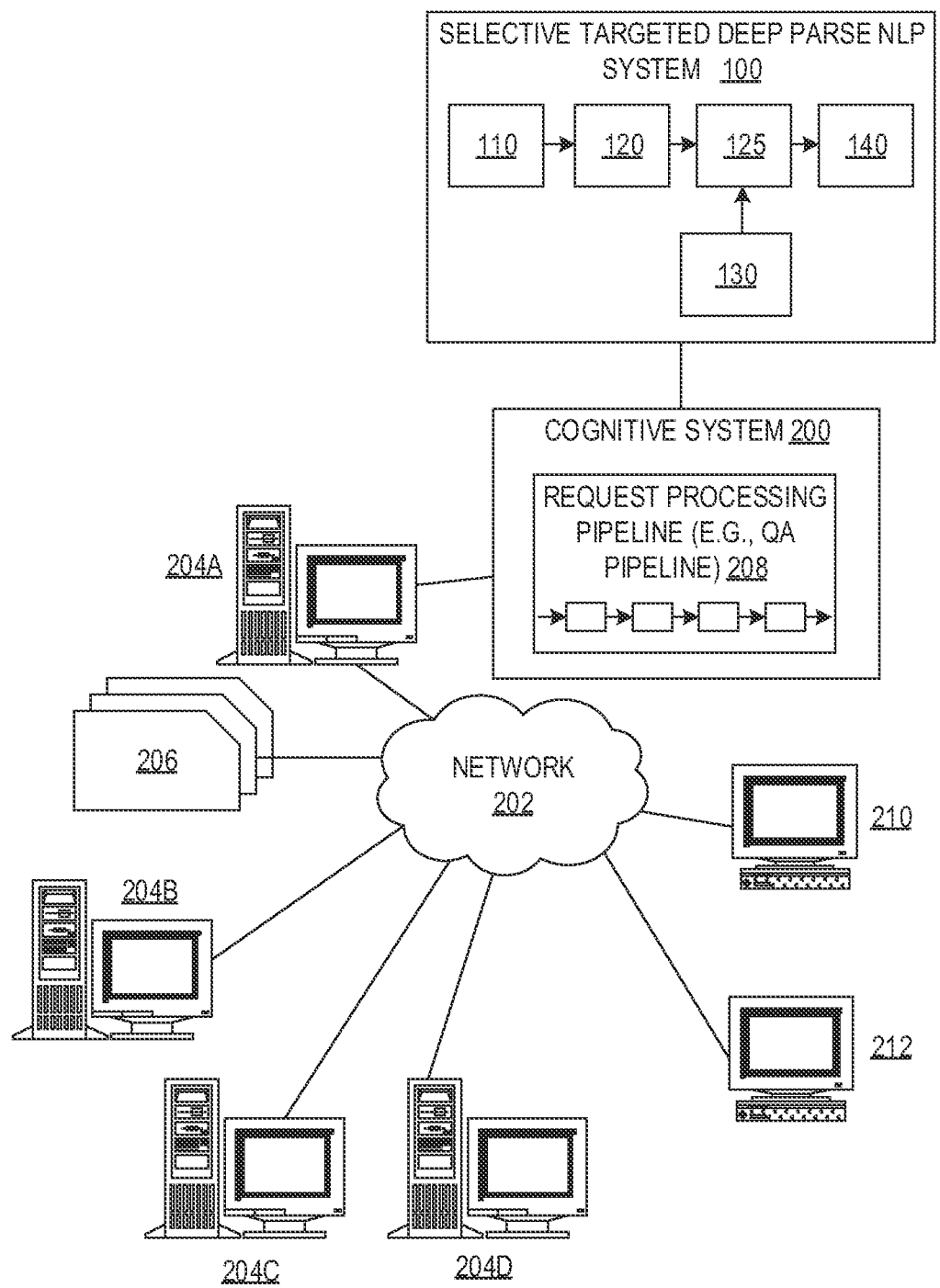
FIG. 2 is a block diagram of an example data processing system in which aspects of the illustrative embodiments are implemented.
Figure 3:
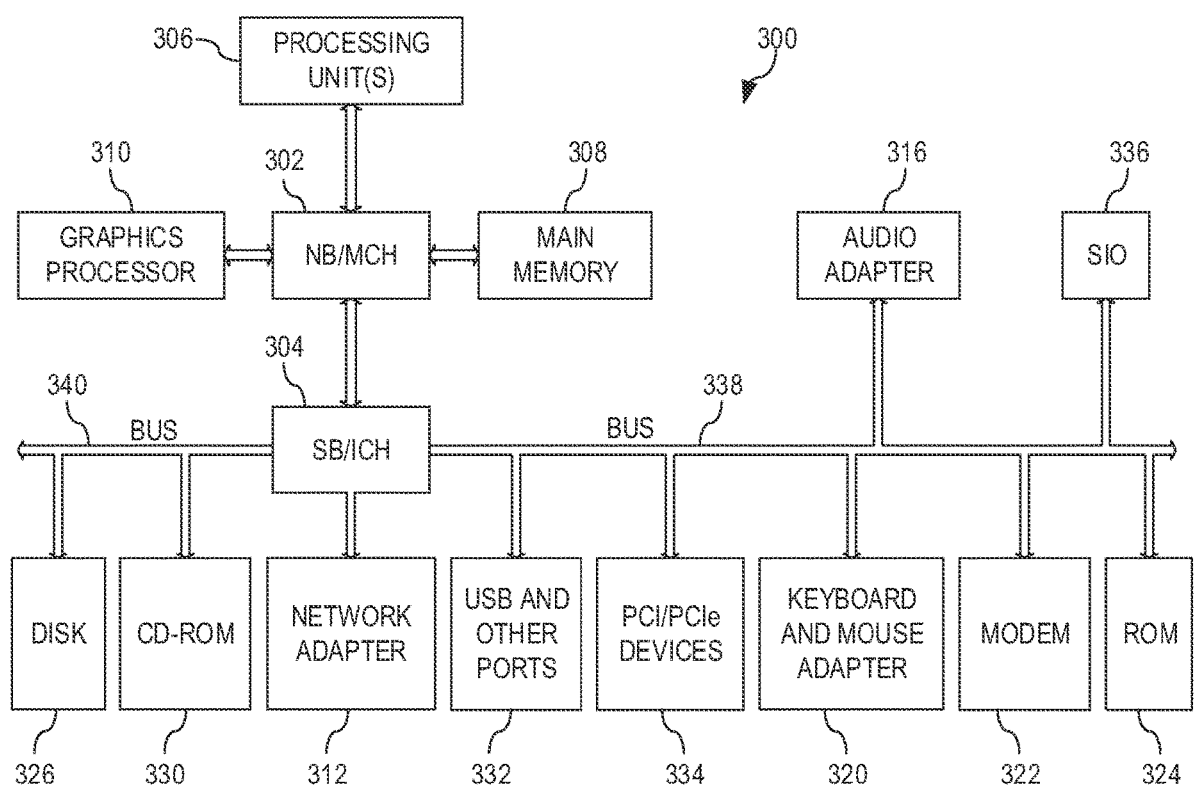
FIG. 3 is an example block diagram of a computing device in which aspects of the illustrative embodiments may be implemented.

In view of the above, it is apparent that the improved computer tool of the illustrative embodiments may be used in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 2-3 are directed to describing example data processing systems and computing devices which may be specifically configured to implement aspects of the selective targeted deep parse natural language processing system of one or more illustrative embodiments. FIG. 2 is an example distributed data processing system in which aspects of the selective targeted deep parse natural language processing system may be implemented in accordance with one illustrative embodiment. FIG. 3 shows an example block diagram of a computing device which may be configured to implement elements of the selective targeted deep parse natural language processing system in accordance with one or more illustrative embodiments.

With reference to FIG. 2, in the depicted example of FIG. 2, the selective targeted deep parse natural language processing system operates as part of or in conjunction with a cognitive system for healthcare applications (also referred to herein as a "healthcare cognitive system") which implements a request processing pipeline, such as a Question Answering (QA) pipeline (also referred to as a Question/Answer pipeline or Question and Answer pipeline) for example, request processing methodology, and request processing computer program product with which the mechanisms of the illustrative embodiments are implemented. These requests may be provided as structure or unstructured request messages, natural language questions, or any other suitable format for requesting an operation to be performed by the healthcare cognitive system. The healthcare cognitive operation performed by the healthcare cognitive system may be any of a plurality of different decision support operations, such as question answering, medical treatment recommendation, or the like.

It should be appreciated that the healthcare cognitive system, while shown as having a single request processing pipeline in the examples hereafter, may in fact have multiple request processing pipelines. Each request processing pipeline may be separately trained and/or configured to process requests associated with different domains or be configured to perform the same or different analysis on input requests (or questions in implementations using a QA pipeline), depending on the desired implementation. For example, in some cases, a first request processing pipeline may be trained to operate on input requests directed to a first medical malady domain (e.g., various types of blood diseases) while another request processing pipeline may be trained to answer input requests in another medical malady domain (e.g., various types of cancers). In other cases, for example, the request processing pipelines may be configured to provide different types of cognitive functions or support different types of healthcare applications, such as one request processing pipeline being used for patient diagnosis, another request processing pipeline being configured for medical treatment recommendation, another request processing pipeline being configured for patient monitoring, etc.

Moreover, each request processing pipeline may have their own associated corpus or corpora that they ingest and operate on, e.g., one corpus for blood disease domain documents and another corpus for cancer diagnostics domain related documents in the above examples. In some cases, the request processing pipelines may each operate on the same domain of input questions but may have different configurations, e.g., different annotators or differently trained annotators, such that different analysis and potential answers are generated. The healthcare cognitive system may provide additional logic for routing input questions to the appropriate request processing pipeline, such as based on a determined domain of the input request, combining and evaluating final results generated by the processing performed by multiple request processing pipelines, and other control and interaction logic that facilitates the utilization of multiple request processing pipelines.

As noted above, one type of request processing pipeline with which the mechanisms of the illustrative embodiments may be utilized is a Question Answering (QA) pipeline. The description of example embodiments of the present invention hereafter will utilize a QA pipeline as an example of a request processing pipeline that may be augmented to include mechanisms in accordance with one or more illustrative embodiments. It should be appreciated that while the present invention will be described in the context of the cognitive system implementing one or more QA pipelines that operate on an input question, the illustrative embodiments are not limited to such. Rather, the mechanisms of the illustrative embodiments may operate on requests that are not posed as "questions" but are formatted as requests for the cognitive system to perform cognitive operations on a specified set of input data using the associated corpus or corpora and the specific configuration information used to configure the cognitive system. For example, rather than asking a natural language question of "What diagnosis applies to patient P?", the cognitive system may instead receive a request of "generate diagnosis for patient P," or the like. It should be appreciated that the mechanisms of the QA system pipeline may operate on requests in a similar manner to that of input natural language questions with minor modifications. In fact, in some cases, a request may be converted to a natural language question for processing by the QA system pipelines if desired for the particular implementation.

As detailed above, the illustrative embodiments may be integrated in, augment, and extend the functionality of the artificial intelligence or cognitive computing system, such as the cognitive system 200 implementing the QA pipeline(s), or request processing pipeline(s) 208, with regard to performing a pre-deep parse evaluation of natural language content of electronic documents ingested from the corpus or corpora. The pre-deep parse evaluation assists with the ingestion operation and/or operation of downstream logic modules/annotators implemented in one or more stages of the QA/request processing pipeline 208 by identifying portions of electronic content from the corpus/corpora that should be deep parsed and which should not in order to generate selected targeted deep parse trees that are used by the downstream logic modules/annotators.

In order to provide a context for example cognitive computing systems with which the mechanisms of the illustrative embodiments may be implemented, the following description provides an understanding of how cognitive systems, and question and answer creation in a cognitive system implementing a QA pipeline, is implemented before describing how the mechanisms of the illustrative embodiments are integrated in and augment such cognitive systems and request processing pipeline, or QA pipeline, mechanisms. It should be appreciated that the mechanisms described in FIGS. 2-3 are only examples and are not intended to state or imply any limitation with regard to the type of cognitive system mechanisms with which the illustrative embodiments are implemented. Many modifications to the example cognitive system shown in FIGS. 2-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

It should be appreciated that even though the computing device attempts to approximate or emulate the human thought processes, the way that computers operate is significantly different than the human mind due to the nature of computers requiring explicit instructions in order to perform operations. For example, while a human mind may see a picture of a cat and be able to intuitively know that the picture is one of a cat, a computing device performing image recognition operations, using a cognitive computing system, must have logic and be trained to recognize certain characteristics of the image data as representative of a cat and properly classify it as such. Thus, while human thought processes may be emulated, the computer operation is a completely different operation from that of a human mind, even though the result may appear to be similar. Ingenuity is required to make a computing device emulate human thought processes due to this fundamental difference in the way a human mind and a computer operate.

IBM Watson™ is an example of a cognitive computing system which can process human readable language via natural language processing mechanisms and identify inferences between text passages with human-like high accuracy at speeds far faster than human beings and on a larger scale. In general, such cognitive systems are able to perform the following functions:

- Navigate the complexities of human language and understanding
- Ingest and process vast amounts of structured and unstructured data
- Generate and evaluate hypothesis
- Weigh and evaluate responses that are based only on relevant evidence
- Provide situation-specific advice, insights, and guidance
- Improve knowledge and learn with each iteration and interaction through machine learning processes
- Enable decision making at the point of impact (contextual guidance)
- Scale in proportion to the task
- Extend and magnify human expertise and cognition
- Identify resonating, human-like attributes and traits from natural language
- Deduce various language specific or agnostic attributes from natural language
- High degree of relevant recollection from data points (images, text, voice) (memorization and recall)
- Predict and sense with situational awareness that mimic human cognition based on experiences
- Answer questions based on natural language and specific evidence In one aspect, cognitive systems provide mechanisms for answering questions posed to these cognitive systems using a Question Answering pipeline or system (QA system) and/or process requests which may or may not be posed as natural language questions. The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

The QA pipeline receives an input question, parses the question to extract the major features of the question, uses the extracted features to formulate queries, and then applies those queries to the ingested electronic content from a corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity. These reasoning algorithms may be the downstream logic modules/annotators for which deep parse trigger data structures may be provided and used by the pre-deep parse engine of the illustrative embodiments to determine which portions of electronic content ingested from the corpus should be deep parsed by a deep parser as part of the natural language processing performed during the ingestion operation.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers. In querying unstructured data, the unstructured data, i.e. the electronic content of the corpus, may be ingested to generate an in-memory representation of the electronic content which is then used as a basis for applying the query and generating results, and this ingestion operation may implement the pre-deep parse engine mechanisms of the illustrative embodiments.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 2 depicts a schematic diagram of one illustrative embodiment of a cognitive system 200 implementing a request processing pipeline 208, which in some embodiments may be a question answering (QA) pipeline, in a computer network 202. For purposes of the present description, it will be assumed that the request processing pipeline 208 is implemented as a QA pipeline that operates on structured and/or unstructured requests in the form of input questions. One example of a question processing operation which may be used in conjunction with the principles described herein is described in U.S. Patent Application Publication No. 2011/0125734, which is herein incorporated by reference in its entirety. The cognitive system 200 is implemented on one or more computing devices 204A-D (comprising one or more processors and one or more memories, and potentially any other computing device elements generally known in the art including buses, storage devices, communication interfaces, and the like) connected to the computer network 202. For purposes of illustration only, FIG. 2 depicts the cognitive system 200 being implemented on computing device 204A only, but as noted above the cognitive system 200 may be distributed across multiple computing devices, such as a plurality of computing devices 204A-D.

The network 202 includes multiple computing devices 204A-D, which may operate as server computing devices, and 210-212 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 200 and network 202 enables question processing and answer generation (QA) functionality for one or more cognitive system users via their respective computing devices 210-212. In other embodiments, the cognitive system 200 and network 202 may provide other types of cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 200 may be used with components, systems, subsystems, and/or devices other than those that are depicted herein.

The cognitive system 200 is configured to implement a request processing pipeline 208 that receive inputs from various sources. The requests may be posed in the form of a natural language question, natural language request for information, natural language request for the performance of a cognitive operation, or the like. For example, the cognitive system 200 receives input from the network 202, a corpus or corpora of electronic documents 206, cognitive system users, and/or other data and other possible sources of input. In one embodiment, some or all of the inputs to the cognitive system 200 are routed through the network 202. The various computing devices 204A-D on the network 202 include access points for content creators and cognitive system users. Some of the computing devices 204A-D include devices for a database storing the corpus or corpora of data 206 (which is shown as a separate entity in FIG. 2 for illustrative purposes only). Portions of the corpus or corpora of data 106 may also be provided on one or more other network attached storage devices, in one or more databases, or other computing devices not explicitly shown in FIG. 2. The network 202 includes local network connections and remote connections in various embodiments, such that the cognitive system 200 may operate in environments of any size, including local and global, e.g., the Internet.

In one embodiment, the content creator creates content in a document of the corpus or corpora of data 206 for use as part of a corpus of data with the cognitive system 200. The document includes any file, text, article, or source of data for use in the cognitive system 200. Cognitive system users access the cognitive system 200 via a network connection or an Internet connection to the network 202, and input questions/requests to the cognitive system 200 that are answered/processed based on the content in the corpus or corpora of data 206. In one embodiment, the questions/requests are formed using natural language. The cognitive system 200 parses and interprets the question/request via a pipeline 208, and provides a response to the cognitive system user, e.g., cognitive system user 210, containing one or more answers to the question posed, response to the request, results of processing the request, or the like. In some embodiments, the cognitive system 200 provides a response to users in a ranked list of candidate answers/responses while in other illustrative embodiments, the cognitive system 200 provides a single final answer/response or a combination of a final answer/response and ranked listing of other candidate answers/responses.

The cognitive system 200 implements the pipeline 208 which comprises a plurality of stages for processing an input question/request based on information obtained from the corpus or corpora of data 206. The pipeline 208 generates answers/responses for the input question or request based on the processing of the input question/request and the corpus or corpora of data 206.

In some illustrative embodiments, the cognitive system 200 may be the IBM Watson™ cognitive system available from International Business Machines Corporation of Armonk, N.Y., which is augmented with the mechanisms of the illustrative embodiments described hereafter. As outlined previously, a pipeline of the IBM Watson™ cognitive system receives an input question or request which it then parses to extract the major features of the question/request, which in turn are then used to formulate queries that are applied to the corpus or corpora of data 206. Based on the application of the queries to the corpus or corpora of data 206, a set of hypotheses, or candidate answers/responses to the input question/request, are generated by looking across the corpus or corpora of data 206 for portions of the corpus or corpora of data 206 (hereafter referred to simply as the corpus 206) that have some potential for containing a valuable response to the input question/response (hereafter assumed to be an input question). The pipeline 208 of the IBM Watson™ cognitive system then performs deep analysis on the language of the input question and the language used in each of the portions of the corpus 206 found during the application of the queries using a variety of reasoning algorithms.

The scores obtained from the various reasoning algorithms are then weighted against a statistical model that summarizes a level of confidence that the pipeline 108 of the IBM Watson™ cognitive system 200, in this example, has regarding the evidence that the potential candidate answer is inferred by the question. This process is be repeated for each of the candidate answers to generate ranked listing of candidate answers which may then be presented to the user that submitted the input question, e.g., a user of client computing device 210, or from which a final answer is selected and presented to the user. More information about the pipeline 208 of the IBM Watson™ cognitive system 200 may be obtained, for example, from the IBM Corporation website, IBM Redbooks, and the like. For example, information about the pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In the context of the present invention, cognitive system 200 may provide a cognitive functionality for assisting with healthcare based operations. For example, depending upon the particular implementation, the healthcare based operations may comprise patient diagnostics, medical treatment recommendation systems, medical practice management systems, personal patient care plan generation and monitoring, patient electronic medical record (EMR) evaluation for various purposes, such as for identifying patients that are suitable for a medical trial or a particular type of medical treatment, or the like. Thus, the cognitive system 200 may be a healthcare cognitive system 200 that operates in the medical or healthcare type domains and which may process requests for such healthcare operations via the request processing pipeline 208 input as either structured or unstructured requests, natural language input questions, or the like.

As shown in FIG. 2, the cognitive system 200 is further augmented, in accordance with the mechanisms of the illustrative embodiments, to include logic implemented in specialized hardware, software executed on hardware, or any combination of specialized hardware and software executed on hardware, for implementing a selective targeted deep parse natural language processing system 100. The selective targeted deep parse natural language processing system 100 operates during ingestion of electronic content from the one or more corpora to perform a pre-deep parse evaluation of the natural language content present in the electronic content to identify specific portions of natural language content present in the electronic content that should be targeted for deep parsing and portions of the natural language content that should not be targeted for deep parsing. As described previously with regard to FIG. 1, this determination is based on deep parse triggers associated with the downstream logic modules/annotators that are enabled for the particular implementation of the natural language processing-based system for which the deep parse is being performed. The electronic content is then flagged/annotated so as to specifically identify which portions of the electronic content should be deep parsed and in some illustrative embodiments which, if any, should not be deep parsed. Based on the flagged portions of the electronic content, those portions of the natural language content are deep parsed to generate deep parse trees for those portions so that the resulting deep parse trees are provided to the downstream logic modules/annotators for processing. In this way, a selective targeted deep parsing of natural language content is achieved that greatly reduces the amount of time and computation resources required to provide the deep parse tree information required by downstream logic/annotators.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 2 is provided as an example of one type of data processing system in which aspects of the present invention may be implemented. Many other types of data processing systems may be likewise configured to specifically implement the mechanisms of the illustrative embodiments.

FIG. 3 is a block diagram of an example data processing system in which aspects of the illustrative embodiments are implemented. Data processing system 300 is an example of a computer, such as server 204 or client 210 in FIG. 2, in which computer usable code or instructions implementing the processes for illustrative embodiments of the present invention are located. In one illustrative embodiment, FIG.

2 represents a server computing device, such as a server 204, which, which implements a cognitive system 200 and QA system pipeline 208 augmented to include the additional mechanisms of the illustrative embodiments described hereafter.

In the depicted example, data processing system 300 employs a hub architecture including North Bridge and Memory Controller Hub (NB/MCH) 302 and South Bridge and Input/Output (I/O) Controller Hub (SB/ICH) 304. Processing unit 306, main memory 308, and graphics processor 310 are connected to NB/MCH 302. Graphics processor 310 is connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash basic input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 is connected to SB/ICH 304.

An operating system runs on processing unit 306. The operating system coordinates and provides control of various components within the data processing system 300 in FIG. 3. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 300.

As a server, data processing system 300 may be, for example, an IBM® eServer™ System p® computer system, running the Advanced Interactive Executive (AIX®) operating system or the LINUX® operating system. Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and are loaded into main memory 308 for execution by processing unit 306. The processes for illustrative embodiments of the present invention are performed by processing unit 306 using computer usable program code, which is located in a memory such as, for example, main memory 308, ROM 324, or in one or more peripheral devices 326 and 330, for example.

A bus system, such as bus 338 or bus 340 as shown in FIG. 3, is comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, includes one or more devices used to transmit and receive data. A memory may be, for example, main memory 308, ROM 324, or a cache such as found in NB/MCH 302 in FIG. 3.

Those of ordinary skill in the art will appreciate that the hardware depicted in FIGS. 2 and 3 may vary depending on the implementation. Other internal hardware or peripheral devices, such as flash memory, equivalent non-volatile memory, or optical disk drives and the like, may be used in addition to or in place of the hardware depicted in FIGS. 2 and 3. Also, the processes of the illustrative embodiments may be applied to a multiprocessor data processing system, other than the SMP system mentioned previously, without departing from the spirit and scope of the present invention.

Moreover, the data processing system 300 may take the form of any of a number of different data processing systems including client computing devices, server computing devices, a tablet computer, laptop computer, telephone or other communication device, a personal digital assistant (PDA), or the like. In some illustrative examples, data processing system 300 may be a portable computing device that is configured with flash memory to provide non-volatile memory for storing operating system files and/or user-generated data, for example. Essentially, data processing system 300 may be any known or later developed data processing system without architectural limitation.

Figure 4:
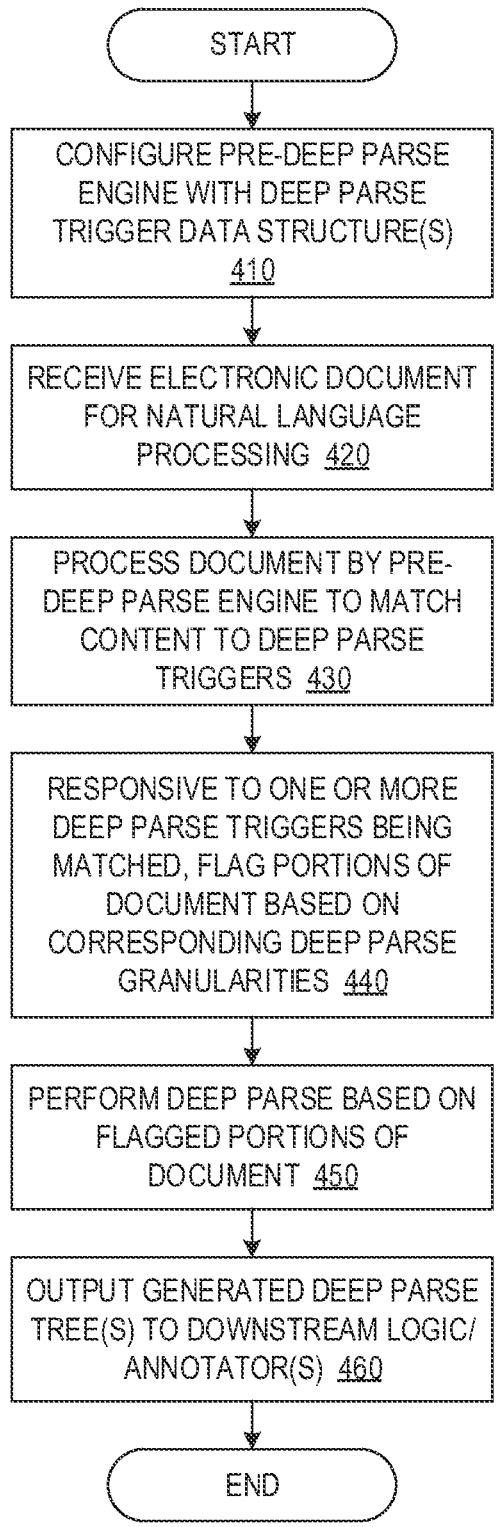
FIG. 4 is a flowchart outlining an example operation of a selective targeted deep parse natural language processing system in accordance with one illustrative embodiment.

FIG. 4 is a flowchart outlining an example operation of a selective targeted deep parse natural language processing system in accordance with one illustrative embodiment. As shown in FIG. 4, the operation starts by configuring a pre-deep parse engine with one or more deep parse trigger data structures corresponding to one or more downstream logic modules/annotators that have been enabled for use by a natural language processing-based computer system (step 410). The one or more deep parse trigger data structures configure the pre-deep parse engine to identify deep parse triggers and have associated with these corresponding deep parse granularities and optionally exclusion granularities.

Having configured the pre-deep parse engine, at some later time point, such as during the ingestion of electronic documents from one or more storage devices storing a corpus of electronic content, an electronic document is received upon which natural language processing is to be performed (step 420). The electronic document is processed by the pre-deep parse engine to attempt to match elements of the natural language content and/or metadata to one or more of the deep parse triggers (step 430). In response to one or more of the deep parse triggers being matched by content/metadata of the electronic document, a corresponding deep parse granularity and/or optional exclusion granularity is retrieved and used to generate a flag annotation in the electronic document to point to a portion of the electronic document that is to be deep parsed and/or excluded from deep parsing (step 440). This process may be performed with regard to each matching deep parse trigger found in the electronic document.

The deep parse flagged electronic document is then provided to a deep parser which performs selected targeted deep parsing on only those portions of the electronic document that are flagged for deep parsing by the flag annotations (step 450). The deep parser generates a deep parse tree that is then provided to downstream logic module(s)/annotator(s) for processing (step 460) and the operation terminates. It should be appreciated that this process may be repeated for each electronic document being ingested such that a plurality of deep parse trees are generated for different electronic documents. Moreover, as noted above, in some illustrative embodiments, there may be separate pre-deep parse engine instances, deep parsers, and deep parse trigger data structures for different annotators such that different deep parse trees may be generated for each annotator based on the same electronic document.

Thus, the illustrative embodiments provide mechanisms for improving the process of parsing natural language content in electronic content by targeting deep parsing on only those portions of electronic content that are most relevant to the downstream logic modules/annotators for which the deep parsing is being performed. In doing so, the amount of computing resources required and the time required to generate deep parse tree data structures for use by this downstream logic or annotators is greatly reduced.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, wherein the at least one memory comprises instructions that are executed by the at least one processor to configure the at least one processor to implement a targeted deep parse natural language processing system, the method comprising:

configuring the targeted deep parse natural language processing system to recognize one or more triggers, wherein the triggers are elements within natural language content that indicate a portion of natural language content that is to be targeted with a deep parse operation;

receiving, by the targeted deep parse natural language processing system, a portion of natural language content from a corpus of natural language content;

performing, by the targeted deep parse natural language processing system, a pre-deep parse scan operation of the portion of natural language content based on the one or more triggers to identify one or more sub-portions of the portion of natural language content that contain at least one of the one or more triggers; and performing, by the targeted deep parse natural language processing system, a natural language processing operation comprising a deep parse of only the one or more sub-portions of the portion of natural language content that contain at least one of the one or more triggers, while other sub-portions of the portion of natural language content are not deep parsed, wherein performing the pre-deep parse scan operation of the portion of natural language content comprises associating with each of the one or more sub-portions of the portion of natural language content, a deep parse indicator specifying that the one or more sub-portions of the portion of natural language content are to be deep parsed by a deep parser of the targeted deep parse natural language processing system, wherein a granularity of each sub-portion is specified in configuration information used to configure the targeted deep parse natural language processing system, and wherein the granularity specified in the configuration information comprises, for at least one of the triggers in the one or more triggers, an exclusion granularity specifying a sub-portion of the portion of natural language content that is to be excluded from a deep parse by a deep parser as part of the performance of the natural language processing operation.

2. The method of claim 1, wherein configuring the targeted deep parse natural language processing system comprises:

determining one or more annotators of a cognitive computing system that are enabled to process the portion of natural language content; and configuring the targeted deep parse natural language processing system with configuration information associated with the one or more annotators, wherein the configuration information specifies triggers for each of the one or more annotators.

3. The method of claim 1, wherein performing the natural language processing operation comprising the deep parse of only the one or more sub-portions of the portion of natural language content that contain at least one of the one or more triggers comprises executing a deep parser on the portion of natural language content, wherein the deep parser skips sub-portions of the portion of natural language content that do not have associated deep parse indicators.

4. The method of claim 1, wherein performing the natural language processing operation comprises generating a parse tree for each of the one or more sub-portions and performing a natural language processing operation on the parse trees for the one or more sub-portions.

5. The method of claim 1, wherein the one or more triggers comprise one or more of terms, phrases, character strings, or metadata.

6. The method of claim 1, wherein the one or more sub-portions of the portion of natural language content comprises at least one portion of metadata associated with the natural language content.

7. The method of claim 1, wherein each trigger has an associated granularity specified in the configuration information, and wherein at least two different triggers have different granularities.

8. The method of claim 1, wherein the natural language processing operation is performed in response to a request from a client computing device, and wherein the natural language processing operation comprises at least one of a decision support natural language processing operation, a question answering operation, or a recommendation generation operation, for responding to the request.

9. A computer program product comprising a computer readable storage medium having a computer readable program stored therein, wherein the computer readable program, when executed on a computing device, causes the computing device to:
configure a targeted deep parse natural language processing system to recognize one or more triggers, wherein the triggers are elements within natural language content that indicate a portion of natural language content that is to be targeted with a deep parse operation;
receive, by the targeted deep parse natural language processing system, a portion of natural language content from a corpus of natural language content;
perform, by the targeted deep parse natural language processing system, a pre-deep parse scan operation of the portion of natural language content based on the one or more triggers to identify one or more sub-portions of the portion of natural language content that contain at least one of the one or more triggers; and
perform, by the targeted deep parse natural language processing system, a natural language processing operation comprising a deep parse of only the one or more sub-portions of the portion of natural language content that contain at least one of the one or more triggers, while other sub-portions of the portion of natural language content are not deep parsed, wherein performing the pre-deep parse scan operation of the portion of natural language content comprises associating with each of the one or more sub-portions of the portion of natural language content, a deep parse indicator specifying that the one or more sub-portions of the portion of natural language content are to be deep parsed by a deep parser of the targeted deep parse natural language processing system, wherein a granularity of each sub-portion is specified in configuration information used to configure the targeted deep parse natural language processing system, and wherein the granularity specified in the configuration information comprises, for at least one of the triggers in the one or more triggers, an exclusion granularity specifying a sub-portion of the portion of natural language content that is to be excluded from a deep parse by a deep parser as part of the performance of the natural language processing operation.

10. The computer program product of claim 9, wherein configuring the targeted deep parse natural language processing system comprises:
determining one or more annotators of a cognitive computing system that are enabled to process the portion of natural language content; and
configuring the targeted deep parse natural language processing system with configuration information associated with the one or more annotators, wherein the configuration information specifies triggers for each of the one or more annotators.

11. The computer program product of claim 9, wherein performing the natural language processing operation comprising the deep parse of only the one or more sub-portions of the portion of natural language content that contain at least one of the one or more triggers comprises executing a deep parser on the portion of natural language content, wherein the deep parser skips sub-portions of the portion of natural language content that do not have associated deep parse indicators.

12. The computer program product of claim 9, wherein performing the natural language processing operation comprises generating a parse tree for each of the one or more sub-portions and performing a natural language processing operation on the parse trees for the one or more sub-portions.

13. The computer program product of claim 9, wherein the one or more triggers comprise one or more of terms, phrases, character strings, or metadata.

14. The computer program product of claim 9, wherein the one or more sub-portions of the portion of natural language content comprises at least one portion of metadata associated with the natural language content.

15. The computer program product of claim 9, wherein each trigger has an associated granularity specified in the configuration information, and wherein at least two different triggers have different granularities.

16. An apparatus comprising:
a processor; and
a memory coupled to the processor, wherein the memory comprises instructions which, when executed by the processor, cause the processor to:
configure a targeted deep parse natural language processing system to recognize one or more triggers, wherein the triggers are elements within natural language content that indicate a portion of natural language content that is to be targeted with a deep parse operation;
receive, by the targeted deep parse natural language processing system, a portion of natural language content from a corpus of natural language content;
perform, by the targeted deep parse natural language processing system, a pre-deep parse scan operation of the portion of natural language content based on the one or more triggers to identify one or more sub-portions of the portion of natural language content that contain at least one of the one or more triggers; and
perform, by the targeted deep parse natural language processing system, a natural language processing operation comprising a deep parse of only the one or more sub-portions of the portion of natural language content that contain at least one of the one or more triggers, while other sub-portions of the portion of natural language content are not deep parsed, wherein performing the pre-deep parse scan operation of the portion of natural language content comprises associating with each of the one or more sub-portions of the portion of natural language content, a deep parse indicator specifying that the one or more sub-portions of the portion of natural language content are to be deep parsed by a deep parser of the targeted deep parse natural language processing system, wherein a granularity of each sub-portion is specified in configuration information used to configure the targeted deep parse natural language processing system, and wherein the granularity specified in the configuration information comprises, for at least one of the triggers in the one or more triggers, an exclusion granularity specifying a sub-portion of the portion of natural language content that is to be excluded from a deep parse by a deep parser as part of the performance of the natural language processing operation.

\* \* \* \* \*